United States Patent Office 3,431,676
Patented Mar. 11, 1969

3,431,676
METHOD AND COMPOSITION FOR THE TREATMENT OF FRUIT TREES
Leo Addin, Rte. 1, Box 2, Hopland, Calif. 95449
No Drawing. Filed Apr. 11, 1966, Ser. No. 541,515
U.S. Cl. 47—58
Int. Cl. A01m 5/00
2 Claims

ABSTRACT OF THE DISCLOSURE

A seasonal treatment for trees, shrubs, and fruit trees stricken with pear decline is described in which a mild soap solution is applied to the soil surrounding the base of the tree and washed into the soil surrounding the root structure with an excess of water to remove insecticide and other spray residues. Subsequently, up to 4 pounds of a solution containing 20 to 40% by weight of dry milk protein, a .02 to .04% trace of an amino acid, and a balance of water or preferably whey are applied to the plant for nourishment and promotion of growth.

---

The present invention generally relates to plant growth promoting compositions. More particularly the present invention appertains to proteinaceous growth stimulants including traces of one or more amino acids, and especially their use in a method for treating fruit trees stricken with decline.

The damage to pear orchards by a disease known as pear decline runs into the millions of dollars annually. The State of California alone has been spending more than a quarter of a million dollars per year to find a cure for the disease and to develop pear strains which are resistant to the disease. In spite of these intensive efforts, no effective antidote has been found by means of which trees affected with decline can be saved from ultimate destruction. The disease does not only affect pear trees, but spreads to other fruit trees as well, causing a similar gradual decline of the tree. Ultimately, the disease causes the death of the plant. While the specific cause remains unknown, there is evidence that there is some association between accumulation of fertilizer or spray residues and derivatives thereof in the graft union between the fruit bearing top portion of the tree and the root stock. Chemical analysis of graft union sections have shown that the concentration of foreign chemical compounds is considerably greater in the graft joint than elsewhere in the tree.

I have finally discovered a remedy for curing trees affected with this form of blight, otherwise known as decline or pear decline. My remedy has been found so effective, that up to 80% of affected pear trees can be saved even if the disease is in the terminal stages. The remedy comprises cleansing the soil by applying fine soap around the base of the tree and "washing" the soap into the soil with a liberal quantity of water. Simultaneously with the cleansing treatment or shortly thereafter, a composition comprising a mixture of one or more proteinaceous substances including a small amount not exceeding .03% of an amino acid to the tree. This mixture may be applied as a solid powdery mixture, around the base of the tree and is then washed into the soil with water. Alternatively the mixture may be applied as a liquid solution of the powder in water, or preferably whey.

In the course of my extensive experimentation, I have surprisingly found that the treatment not only cures plants affected with pear decline, but generally promotes the growth of a large variety of plants including grape vines and berries, or generally all plants having wood stems. While more than three out of four plants respond with a significant growth spurt after my proteinaceous composition is applied, the most spectacular results are obtained with stunted or retarded plants, young trees, or disease ridden plants. While healthy, mature trees tend to respond to the application of the present composition with unusually rigorous growth also, the overall beneficial effect appears to be less pronounced.

Accordingly, a principal object of the present invention is to provide a method for treating trees affected with a blight type disease commonly called pear decline in connection with pear trees.

Another object of the present invention is to provide a method for reconditioning the soil around trees in localities where outbreaks of pear decline or related diseases are observed.

Yet another object of the present invention is to provide a growth stimulant for trees and shrubs, especially for specimens of stunted or retarded growth, and young immature plants.

These and other objects and features of the present invention will become apparent to those skilled in the art upon consideration of the following specific description of preferred growth stimulant compositions and plant treatment methods.

The present method comprises as mentioned spura, a soil cleansing treatment, consisting simply of watering the soil surrounding the tree or shrub, with a mild soap solution, followed by irrigating with copious quantities of water to carry away the chemicals with which the soap interacts. Pure conventional soaps e.g. laundry soap is preferred and applied as a solution comprising up to about 10% by weight soap.

The second step comprises the application of the present growth stimulant. The main ingredient of the growth stimulant composition is protein, which may be any of the large variety of proteins, e.g., vegetable or animal proteins including albumins, globulins, histones, protamines, glycoproteins, for example.

While any protein has been found to work, it is preferred to employ a pulverized, water soluble protein such as albumins, histones, and protamines because the protein is readily washed into the soil. The distribution of the substance to the root system is more uniform and no animals feeding on the protein are attracted.

The care and growth produced in the treated plant is up to a certain limit, proportional to the total quantity of protein applied. Above that limit an excess of protein appears to have no further effect on plant growth. It is reasoned that each plant requires a certain quantum of protein to develop normally, and that excess quantities are simply not utilized or cast off. This limit appears to be between one and 1.5 lbs. of protein for severely stunted or diseased plants.

All protein molecules normally are comprised of many amino acid constituents, which are suspected to play a leading role in the cure of plants. However, it has been found that results obtained by the application of proteins alone fall far short of the beneficial effects achieved if small quantities of free amino acids are admixed to the proteins. Amino acids which have been found to work include amino acids obtained by protein hydrolysis, such as glycine, alanine, valine, leucine, serine, for example, as well as other amino substituted straight chain carboxylic acids.

Since plants are known to produce amino acids from nitrates by way of an enzyme synthesis, it is suspected that spray and chemical residues deleteriously impair enzyme activity and materially limit amino acid synthesis. Since the amino acids are converted into proteins in the plants, a shortage of amino acids is accompanied by a protein shortage also.

The total quantity of amino acids required is extremely small, i.e., between about 6 and 8 grains per average severely damaged plant. Moreover, the curious tendency has been observed that high amino acid concentrations produce abundant leaf growth in the treated plants, however, with little or no permanent growth of the stems. With the application of smaller quantities of the amino acid, e.g., less than about 6 grains, the magnitude of the growth rate rapidly drops off.

While the plant growth stimulant may be applied as a powdery mixture which is strewn around the base of the tree and washed into the ground with water, it is preferred for sakes of convenience as well as somewhat improved results to dissolve the protein and amino acids in a solvent in the appropriate proportional concentrations. The solvent may be water, however liquid whey is preferred.

The liquid growth stimulant is applied around the base of the tree as previously. A small fraction of the stimulant has been sprayed over the top of the plant and has been found effective especially with young plants.

The relative concentrations of ingredients of preferred liquid growth stimulants are given in Table I.

TABLE I

| | Percent by weight |
|---|---|
| Water soluble protein e.g., dry milk | 20–40 |
| Amino acid | .02–.03 |
| Whey | 60–80 |

About three to five pounds of the liquid composition given in Table I are applied to each plant, depending on the size and damage sustained by the plant.

As indicated in the foregoing discussion, the cleansing operation and growth stimulant application are usually carried out successively. However, recent experiments have surprisingly indicated, that the soap may be directly added to the growth stimulant, preferably of the liquid type, and is applied to the soil simultaneously therewith.

Since one would expect that the presence of the soap impairs the activity of the growth stimulant ingredients, the soap probably interacts as a neutralizer with specific substances in the soil, rather than in the fashion of ordinary cleaning operations, where the soap serves as surfactant or interface emulsifier.

About 6%, or generally up to about 10% of soap flakes are added to a solution with the concentrations given in Table I. After pouring the liquid around the base of the tree the solution is allowed to soak into the soil. The tree is then irrigated as mentioned previously.

*Example*

60 pear trees severely damaged by pear decline and generally considered near destruction were treated by the application of a combination cleanser-growth stimulant fluid comprising 30% by weight of dry milk, 0.024% by weight of amino acid, 6.25% by weight of pure laundry soap dissolved in about 62.5% of whey.

About 4 lbs. of the mixture was applied to the base of each tree. Of the 60 trees, 11 trees succumbed during the following year. The remainder of the trees was judged rehabilitated.

While in the foregoing, the invention was discussed primarily with respect to the specific treatment of pear trees, it is to be emphasized, that the growth stimulant and blight cure may be effectively applied to trees and shrubs generally. It will further be apparent to those skilled in the art that numerous obvious modifications may be made in the present treatment method as well as growth stimulant composition without departing from the spirit and scope of the present invention. Accordingly, the present invention is to be limited only by the following claims.

What is claimed is:

1. The method for treating fruit trees stricken with decline comprising the steps of applying to the soil surrounding the base of said trees an aqueous solution containing between 3 and 8 ounces of soap, washing said soap solution into the soil surrounding said base and root structure of the tree with water; and applying to the soil around the base of said tree between about 3 and 5 pounds of an aqueous solution comprising 20 to 40% of dehydrated milk, between .02 and .03% by weight of an amino acid selected from amino acids derived from the hydrolysis of proteins, a balance of 60% to 80% by weight of whey, and irrigating the soil surrounding the base of said tree with water to wash said solution into the soil around the root structure of said tree.

2. A composition of matter for treatment of fruit trees for the control of pear decline, consisting essentially of 20 to 40% by weight of dehydrated milk, .02 to .03% by weight of an amino acid selected from amino acids derived from proteins by hydrolysis, and about 6 to 10% by weight of soap, intimately mixed with and dissolved in a balance of about 60 to 80% by weight of liquid whey.

References Cited

UNITED STATES PATENTS

| 1,950,068 | 3/1934 | Spangenberg | 71—77 |
| 2,654,668 | 10/1953 | Weibel | 71—114 |
| 2,689,173 | 9/1954 | Clarke | 71—77 |
| 2,734,816 | 2/1956 | Wood et al. | 71—113 |
| 2,763,540 | 9/1956 | Steward et al. | 71—77 |
| 2,684,946 | 7/1954 | Schmitz | 167—22 |
| 2,965,534 | 12/1960 | Darlington | 167—22 |

OTHER REFERENCES

Riggs et al., "Nutritive Value of Whey Powder Protein" (1955) CA49, p. 9834 (1955).

Obraztsova et al., "Dynamics of Collold-Chemical Properties, etc." (1963) CA59, pp. 5507–08 (1963).

Woodard et al., "Nucleic Acid & Protein Metabolism, etc." (1961) CA55, pp. 18887–88 (1961).

Jensen et al., "Uptake of Proteins By Plant Cells" (1960) CA55, p. 18888 (1961).

LEWIS GOTTS, *Primary Examiner.*

G. HOLLRAH, *Assistant Examiner.*

U.S. Cl. X.R.

21—58; 424—177, 95, 319